July 20, 1937.   H. W. PRICE ET AL   2,087,387
CLUTCH CONTROL MECHANISM
Original Filed Feb. 12, 1932
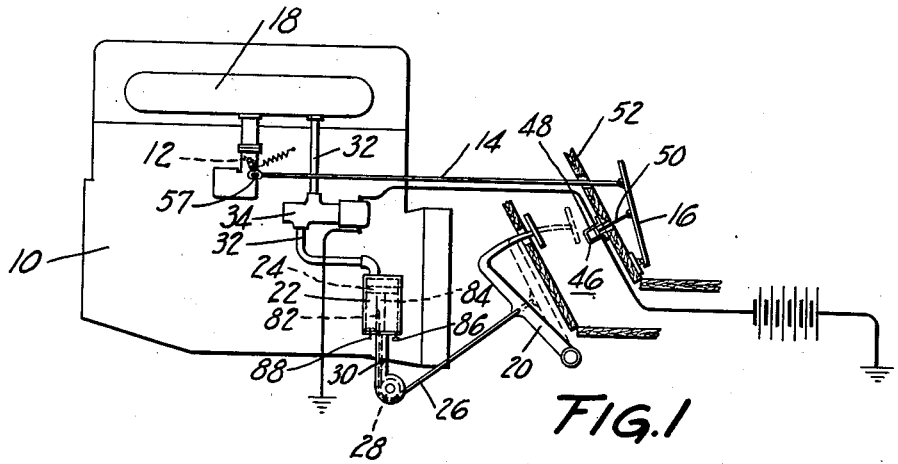
FIG.1
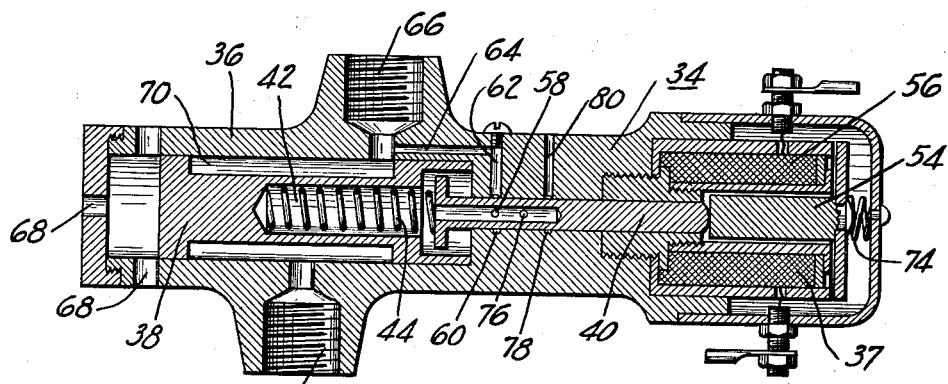
FIG.2
FIG.3
INVENTOR.
HAROLD W. PRICE
EARL R. PRICE
BY
H. Q. Clayton
ATTORNEY Patented July 20, 1937

2,087,387

UNITED STATES PATENT OFFICE 2,087,387

CLUTCH CONTROL MECHANISM

Harold W. Price and Earl R. Price, South Bend, Ind., assignors to Bendix Aviation Corporation, South Bend, Ind., a corporation of Delaware Original application February 12, 1932, Serial No. 592,582. Divided and this application May 28, 1936, Serial No. 82,194

4 Claims. (Cl. 192—.01)

This invention relates to power means for operating a conventional automotive clutch and is particularly designed as an improvement over the mechanism suggested in the patent to Belcia, No. 1,470,272, dated October 9, 1923.

This patent, in brief, discloses a vacuum operated fluid motor for disengaging the clutch, the control valve for the motor being operated by the accelerator pedal. There is also disclosed in this patent a positive connection between the pedal and valve which necessitates a careful adjustment of the parts when this control mechanism is incorporated as an accessory in a used automobile.

It is the principal object of this invention to avoid the difficulties referred to by providing a compact valve or control unit including electrical means for operating the valve in which the electrical means is remotely controlled by a switch operated accelerator pedal. The control unit may thus be conveniently secured to a rigid part of the vehicle and the flexible lead wires run to the accelerator pedal switch, which installation is quickly effected.

A particular object of the invention is to provide an efficient control unit for the clutch motor and to that end there is provided a one-piece casing, housing a solenoid, relay valve parts and three-way valve parts, the latter to directly control the operation of the motor. The aforementioned elements are so constructed and arranged as to provide for an operation of the relay valve by the solenoid, which in turn controls the operation of the motor control valve.

A further object of the invention is to provide power means for operating the relay valve. The power means includes a spring so arranged with respect to the remaining parts of the unit as to function as a means for operating the three-way motor controlling valve.

Yet another object of the invention is to provide electrical means, operating on the minimum current possible, for indirectly operating a three-way motor control valve.

Other objects of the invention and desirable details of construction and combinations of parts will become apparent from the following description of a preferred embodiment, which description is taken in conjunction with the accompanying drawing, in which:

Figure 1 is a diagrammatic view disclosing the essential elements of the power operated clutch control mechanism; and Figures 2 and 3 are longitudinal sectional views taken through the control unit constituting the essence of the invention.

Referring now to the general arrangement of parts disclosed diagrammatically in Figure 1, there is provided an internal-combustion engine 10 having the usual throttle 12, throttle rod 14, accelerator 16, intake manifold 18 and clutch pedal 20. At closed throttle a vacuum of some twenty inches of mercury is induced in the manifold 18 by virtue of the pumping action of the engine pistons. This evacuated condition of the manifold is employed to energize a clutch controlling fluid motor 22, the piston 24 of which is connected to the clutch pedal 20 by means of a flexible cable 26 passed over a sheave 28 mounted in the end of a projection 30 extending from the motor casing. A control valve 34 is interposed in a fluid conduit 32 and serves to interconnect the manifold 18 and fluid clutch motor 22. The control valve 34 and means for operating the same are compacted in a single control unit designated by the reference numeral 34. Thus far described the mechanism is, in a general way, similar to that disclosed in the patent to Belcia, No. 1,470,272, the instant invention constituting an improvement thereover.

Describing now the refinements of the present invention, the unit 34 preferably comprises a one-piece casing 36, housing a solenoid 37 and axially aligned reciprocable piston valve members 38 and 40. Valve member 38 is bored to receive the flanged end of the valve member 40 and is counterbored to provide a chamber 42 to receive a spring 44, the latter abutting the end of the member 40. The solenoid 37 is energized by the closing of a switch 46, the relatively movable parts 48 and 50 of which are secured to a floorboard 52 and to the accelerator pedal 16, respectively.

Describing now the operation of the aforementioned mechanism, when the engine 10 is started with the throttle 12 closed, the aforementioned vacuum is created in the manifold 18. The accelerator pedal 16 is at this time released to thereby close the switch 46, as disclosed in Figure 1. The solenoid 37 is thus energized, a movable armature member 54 of which is drawn into a winding 56. A slot 57 in the link 14 is so positioned with respect to the throttle 12 as to insure a complete closing of the throttle before the switch 46 is closed.

The armature member 54 contacts the end of the piston valve member 40, forcing the same to the left to the position disclosed in Figure 2. In this position an opening 58 in the member 40 registers with a groove 60 in the casing 36, the groove registering with interconnected ducts 62 and 64. Duct 64 registers with a port 66 in the casing 36, which port is connected to the manifold by the upper portion of the flexible conduit 32. The air in the chambers defined by the bores in the valve members 38 and 40 is then drawn out, creating a partial vacuum in said chambers. Valve member 38 is then forced to the right to the position disclosed in Figure 2 by virtue of the pressure of the atmosphere, the latter being admitted to the casing 36 via ports 68. The spring 44 is compressed by this movement.

The aforementioned movement of the piston valve member 38 to the right serves to register, via a recess 70 in the member 38, port 66 with a port 72, the latter being connected to the lower section of the conduit 32. The clutch motor 22 is thus placed in communication with the manifold at closed throttle to evacuate the same and move the piston 24 upwardly. The clutch pedal is thus moved to disengage the clutch, as disclosed in Figure 1.

It will be noted that such action occurs whenever the accelerator pedal is released; therefore, the clutch is automatically disengaged whenever the throttle is closed by the accelerator, whether the vehicle be parked or in motion.

Describing now the operation of the mechanism to engage the clutch, opening of the throttle by depressing the accelerator pedal serves to open the switch 46. The solenoid 37 is thus deenergized, permitting a tensioned spring 74 to withdraw the armature plunger 54. The compressed spring 44 then moves the valve member 40 to the right to register a port 76 with a groove 78, the latter being vented to the atmosphere via a duct 80. Air then rushes into the bores of the valve members 38 and 40, permitting the spring 44, which has been only partially expanded, to move the piston valve member 38 to the left, to first cut off the interconnection of port 66 with port 72 and then register atmospheric ports 68 with the port 72 via the recess 70.

Air is thus permitted to flow into the evacuated end of the clutch motor 22 and permit the clutch to engage under the action of its spring. The rate of such engagement may be controlled by regulating the efflux of air from the compression side of the motor, this being accomplished by the provision of a slot 82 in a piston rod 84 and an adjustable needle valve 86. A check valve 88 insures the clutch disengaging movement of the piston.

There is thus provided a very compact and effective control unit which may be conveniently secured to any rigid portion of the vehicle, such as the motor casing; thereby facilitating a field installation of the clutch control mechanism on a used automobile.

Briefly reviewing the parts of the unit 34 and its several functions, it will be seen that the ported casing 36 and recessed piston member 38 together constitute a three-way control valve for the clutch operating fluid motor 22. The ported casing 36 and ported piston member 40 together constitute a relay valve member. The solenoid 37 serves as a power means for operating the relay valve in one phase of its operation. The relay valve serves to control a source of vacuum power to operate the aforementioned three-way valve, opening the same to energize the clutch motor. A spring interposed between the aforementioned valves serves to actuate the relay valve in the second phase of its operation and also serves as a power means to operate the aforementioned three-way valve to close the same and deenergize the clutch operating motor.

This application is a division of our copending application Serial No. 592,582, filed February 12, 1932.

While one illustrative embodiment has been described, it is not our intention to limit the scope of the invention to that particular embodiment, or otherwise than by the terms of the appended claims.

We claim:

1. A fluid motor controlling valve unit comprising a casing, said casing housing axially aligned reciprocable valve members and a solenoid, said valve members being spaced by a valve operating spring member.

2. A control unit adapted to be incorporated in a clutch controlling mechanism, said unit comprising a one-piece double-ended casing, a solenoid unit housed within one end of said casing, a three-way reciprocable piston valve member housed within the other end of said valve unit and a reciprocable relay valve member interposed between said aforementioned solenoid unit and piston valve member.

3. A control unit adapted to be incorporated in a clutch controlling mechanism, said unit comprising a one-piece double-ended casing, a solenoid unit housed within one end of said casing, a three-way reciprocable piston valve member housed within the other end of said valve unit and a reciprocable relay valve member interposed between said aforementioned solenoid unit and piston valve member, said casing being provided with ports adapted to register with said reciprocable valve members.

4. A power clutch control valve unit comprising axially aligned three-way and relay valves and a solenoid, the latter adapted to operate said relay valve, said solenoid, relay valve and three-way valve being constructed and arranged to be successively rendered operative.

HAROLD W. PRICE.
EARL R. PRICE.